United States Patent
Dairoku et al.

(10) Patent No.: US 6,875,511 B2
(45) Date of Patent: Apr. 5, 2005

(54) PRODUCTION PROCESS FOR PARTICULATE WATER-ABSORBENT RESIN

(75) Inventors: Yorimichi Dairoku, Himeji (JP); Yoshio Irie, Himeji (JP); Kenji Tada, Himeji (JP); Shinichi Fujino, Himeji (JP); Makoto Nagasawa, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 151 days.

(21) Appl. No.: 10/443,777

(22) Filed: May 23, 2003

(65) Prior Publication Data

US 2003/0224163 A1 Dec. 4, 2003

(30) Foreign Application Priority Data

May 30, 2002 (JP) ........................................ 2002-158092

(51) Int. Cl.$^7$ ................................................. B32B 5/16
(52) U.S. Cl. ....................... 428/402; 428/403; 428/407; 525/329.7; 525/330.1; 525/384; 521/64
(58) Field of Search ................................ 428/402, 403, 428/407; 525/329.7, 330.1, 384; 521/64

(56) References Cited

U.S. PATENT DOCUMENTS

| | | | |
|---|---|---|---|
| 5,026,800 A | | 6/1991 | Kimura et al. |
| 5,244,735 A | * | 9/1993 | Kimura et al. ............... 428/402 |
| 5,250,640 A | | 10/1993 | Irie et al. |
| 5,275,773 A | | 1/1994 | Irie et al. |
| 5,385,983 A | | 1/1995 | Graham |
| 5,419,956 A | | 5/1995 | Roe |
| 5,447,727 A | | 9/1995 | Graham |
| 5,505,718 A | | 4/1996 | Roe et al. |
| 6,087,002 A | * | 7/2000 | Kimura et al. ............... 428/402 |
| 6,140,395 A | | 10/2000 | Hatsuda et al. |
| 6,187,902 B1 | | 2/2001 | Yanase et al. |
| 6,254,990 B1 | * | 7/2001 | Ishizaki et al. ............... 428/402 |
| 6,342,652 B1 | * | 1/2002 | Harada et al. ............... 604/358 |
| 6,576,713 B2 | * | 6/2003 | Ishizaki et al. ............ 525/329.7 |
| 6,720,389 B2 | * | 4/2004 | Hatsuda et al. ............ 525/330.1 |
| 6,809,158 B2 | * | 10/2004 | Ikeuchi et al. ............... 525/375 |
| 6,817,557 B2 | * | 11/2004 | Kakita et al. .................. 241/23 |

FOREIGN PATENT DOCUMENTS

| | | |
|---|---|---|
| EP | 0 467 073 A1 | 1/1992 |
| EP | 0 574 248 A2 | 12/1993 |
| EP | 0 925 836 A1 | 6/1999 |
| EP | 1 002 806 A1 | 5/2000 |
| EP | 1 178 059 A2 | 2/2002 |
| JP | 6-329716 | 11/1994 |
| JP | 10-182750 | 7/1998 |
| JP | 11-188725 | 7/1999 |
| JP | 11-188726 | 7/1999 |
| JP | 11-349687 | 12/1999 |

* cited by examiner

*Primary Examiner*—Ieszek B Kiliman
(74) *Attorney, Agent, or Firm*—Roylance, Abrams, Berdo & Goodman, L.L.P.

(57) ABSTRACT

The present invention provides: a production process for a particulate water-absorbent resin with high productivity, which production process is carried out in such a manner that the particulate water-absorbent resin will contain particles with particle diameters of 150 to 850 μm (but excluding 850 μm) in an amount of not smaller than 75 weight % of the particulate water-absorbent resin after the pulverization step or after the pulverization step and the drying step even if the adjustment of the particle diameters is not carried out by the sieving classification procedure; a novel particulate water-absorbent resin having high properties; and a sanitary material comprising this particulate water-absorbent resin. The production process for a particulate water-absorbent resin, according to the present invention, is carried out in such a manner that the particulate water-absorbent resin will contain particles with particle diameters of 150 to 850 μm (but excluding 850 μm) in an amount of not smaller than 75 weight % of the particulate water-absorbent resin after the pulverization step or after the pulverization step and the drying step; with the production process being characterized in that, in the pulverization step, a hydropolymer of a water-absorbent resin having a water content of 10 to 30 weight % is pulverized with a pulverizer.

12 Claims, No Drawings

PRODUCTION PROCESS FOR PARTICULATE WATER-ABSORBENT RESIN

BACKGROUND OF THE INVENTION

A. Technical Field

The present invention relates to: a production process for a particulate water-absorbent resin, in which fine particles or superfine particles form little, and the formation of coarse particles can also be suppressed, and particles having an objective particle diameter range are obtained in a good yield; a novel particulate water-absorbent resin having high properties; and a sanitary material comprising this particulate water-absorbent resin.

B. Background Art

Water-absorbent resins are widely utilized for various uses, such as sanitary articles (e.g. disposable diapers, sanitary napkins, and adult incontinent products) and water-retaining agents for soil, and are produced and consumed in large quantities.

Particularly in recent years, in uses of sanitary articles (e.g. disposable diapers, sanitary napkins, and adult incontinent products), the amount of the water-absorbent resins as used tends to be increased, and the amount of pulp fibers as used tends to be decreased, in order to thin the resultant products. The water-absorbent resins are desired to have a large absorption capacity under a load. On the other hand, there are desired low-cost water-absorbent resins because the amount of the water-absorbent resins as used per sheet of the sanitary articles increases.

The water-absorbent resins are generally provided in a powdery state by carrying out aqueous solution polymerization of water-soluble ethylenically unsaturated monomers to thereby obtain a hydrogel polymer, and then drying and pulverizing this polymer. The above hydrogel polymer is obtained as a bulky structure or an aggregated structure of hydrogel particles, and is usually roughly disintegrated with a pulverizer such as a kneader and a meat chopper. The hydrogel as roughly disintegrated is dried until its solid component concentration reaches about 95 weight %, and thereafter pulverized with a pulverizer and then sieved with a classification machine, whereby the particle diameters of the hydrogel are adjusted into a predetermined range. As a result, particulate water-absorbent resins are obtained. Although there is a difference depending upon the uses, there are usually favorably used water-absorbent resins having particle diameters of 150 to 850 µm (but excluding 850 µm) as the water-absorbent resins for sanitary articles.

Hereupon, in addition to the particles having the predetermined particle diameter range, particles with particle diameters of smaller than the predetermined particle diameter range are concomitantly generated in the pulverization step after the drying step. When the water-absorbent resins contain what is called fine powder such as fine particles with particle diameters of smaller than 150 µm or superfine particles with particle diameters of smaller than 106 µm (so-called a fine powder), there are disadvantages in sanitation because of causing such as powder scatter when the water-absorbent resins are handled, and further there are disadvantages in that the lowering of properties (such as lowering of absorption capacity of the water-absorbent resins under a load or lowering of liquid permeability) also occurs. However, the removal of this fine powder results in lowering a yield in the production and leads to the rise of cost. Therefore, techniques of recycling the fine powder are usually introduced. However, in the case of a large amount of the fine powder after the pulverization step, it takes much time to sieve the fine powder, or the enlargement of sieving-apparatuses is caused. Even if the recycling is carried out, operational difficulties increase, and the lowering of productivity and the rise of cost are caused. Therefore, it is necessary to reduce the amount of the fine powder as contained in a period of from after the pulverization step till before the sieving classification procedure. On the other hand, the sieving of particles which are contained after the pulverization step and have particle diameters of not smaller than the predetermined range (so-called coarse particles) is very easy in comparison with that of the fine powder, but the resultant sieved particles are usually pulverized again after the sieving step. Therefore, it is preferred that the amount of the coarse particles should also be small. That is to say, as to the particles as obtained in a period of from after the pulverization step till before the sieving classification procedure, it is desired that: the yield of particles having the predetermined particle diameter range (in other words, having a narrow particle diameter range) is high, and further the fine powder and the coarse particles are sufficiently reduced. Accordingly, the development of such a pulverization step has been demanded.

SUMMARY OF THE INVENTION

A. Object of the Invention

An object of the present invention is to provide: a production process for a particulate water-absorbent resin with high productivity, which production process is carried out in such a manner that the particulate water-absorbent resin will contain particles with particle diameters of 150 to 850 µm (but excluding 850 µm) in an amount of not smaller than 75 weight % of the particulate water-absorbent resin after the pulverization step or after the pulverization step and the drying step even if the adjustment of the particle diameters is not carried out by the sieving classification procedure; a novel particulate water-absorbent resin having high properties; and a sanitary material comprising this particulate water-absorbent resin.

B. Disclosure of the Invention

The present inventors diligently studied in order to solve the above-mentioned problems. As a result, they have completed the present invention by finding out that: in the case where the pulverization step is carried out in such a state that the water content of a hydropolymer being subjected to the pulverization step is adjusted in a certain range, namely, in the case where a hydropolymer having a water content of 10 to 30 weight % is pulverized with a pulverizer, the particulate water-absorbent resin, in which the yield of particles having a narrow particle diameter range is high and further the fine powder and the coarse particles are sufficiently reduced, can be obtained with good productivity.

Accordingly, a production process for a particulate water-absorbent resin, according to the present invention, is carried out in such a manner that the particulate water-absorbent resin will contain particles with particle diameters of 150 to 850 µm (but excluding 850 µm) in an amount of not smaller than 75 weight % of the particulate water-absorbent resin after the pulverization step or after the pulverization step and the drying step; with the production process being characterized in that, in the pulverization step, a hydropolymer of a water-absorbent resin having a water content of 10 to 30 weight % is pulverized with a pulverizer.

In the present invention production process for a particulate water-absorbent resin, the hydropolymer to be subjected to the pulverization step is favorably a product obtained by the drying step of drying a hydropolymer of a water-absorbent resin having a water content of more than 30 weight %.

In the present invention production process for a particulate water-absorbent resin, the hydropolymer of the water-absorbent resin having a water content of 10 to 20 weight % is favorably pulverized with the pulverizer.

In the present invention production process for a particulate water-absorbent resin, the hydropolymer of the water-absorbent resin having a water content of 10 to 20 weight % is favorably pulverized with the pulverizer wherein the hydropolymer is a product obtained by the drying step of drying a hydropolymer of a water-absorbent resin having a water content of not less than 30 weight %.

The present invention production process for a particulate water-absorbent resin is favorably carried out in such a manner that the particulate water-absorbent resin will contain particles with particle diameters of 150 to 850 μm (but excluding 850 μm) in an amount of not smaller than 80 weight % of the particulate water-absorbent resin after the pulverization step or after the pulverization step and the drying step.

The present invention production process for a particulate water-absorbent resin is favorably carried out in such a manner that the particulate water-absorbent resin will contain fine particles with particle diameters of smaller than 150 μm in an amount of not larger than 15 weight % of the particulate water-absorbent resin after the pulverization step or after the pulverization step and the drying step.

The present invention production process for a particulate water-absorbent resin is favorably carried out in such a manner that the particulate water-absorbent resin will contain superfine particles with particle diameters of smaller than 106 μm in an amount of not larger than 10 weight % of the particulate water-absorbent resin after the pulverization step or after the pulverization step and the drying step.

The present invention production process for a particulate water-absorbent resin is favorably carried out in such a manner that the particulate water-absorbent resin will contain coarse particles with particle diameters of not smaller than 850 μm in an amount of not larger than 10 weight % of the particulate water-absorbent resin after the pulverization step or after the pulverization step and the drying step.

In the present invention production process for a particulate water-absorbent resin, the temperature of the hydropolymer is favorably in the range of 30 to 100° C. during the pulverization step.

The present invention production process for a particulate water-absorbent resin favorably further comprises the step of, at the same time as the pulverization step, mixing a surface-crosslinking agent or, at the same time as the pulverization step, mixing a surface-crosslinking agent to thereby carry out a crosslinking reaction.

A particulate water-absorbent resin, according to the present invention, displays an absorption capacity of 25 to 50 g/g without load and an absorption capacity of not less than 25 g/g under a load, and is obtained by a production process that is carried out in such a manner that the particulate water-absorbent resin will contain particles with particle diameters of 150 to 850 μm (but excluding 850 μm) in an amount of not smaller than 75 weight % of the particulate water-absorbent resin after the pulverization step or after the pulverization step and the drying step, wherein the production process for obtaining the particulate water-absorbent resin includes: the pulverization step of pulverizing a hydropolymer of a water-absorbent resin having a water content of 10 to 30 weight % with a pulverizer; and the step of, at the same time as the pulverization step, mixing a surface-crosslinking agent or, at the same time as the pulverization step, mixing a surface-crosslinking agent to thereby carry out a crosslinking reaction.

The present invention particulate water-absorbent resin favorably contains a finely particulate inorganic substance.

A sanitary material, according to the present invention, comprises the present invention particulate water-absorbent resin.

These and other objects and the advantages of the present invention will be more fully apparent from the following detailed disclosure.

DETAILED DESCRIPTION OF THE INVENTION

Hereinafter, the modes for carrying out the present invention are explained in detail.

The hydropolymer to be pulverized in the present invention process is obtained by polymerizing the below-exemplified monomer component.

Examples of the monomer component include: anionic unsaturated monomers (e.g. (meth)acrylic acid, (anhydrous) maleic acid, itaconic acid, cinnamic acid, vinylsulfonic acid, allyltoluenesulfonic acid, vinyltoluenesulfonic acid, styrenesulfonic acid, 2-(meth)acrylamido-2-methylpropanesulfonic acid, 2-(meth)acryloylethanesulfonic acid, 2-(meth)acryloylpropanesulfonic acid, 2-hydroxyethyl (meth)acryloyl phosphate) and their salts; mercapto-group-containing unsaturated monomers; phenolic-hydroxyl-group-containing unsaturated monomers; amide-group-containing unsaturated monomers, such as (meth)acrylamide, N-ethyl(meth)acrylamide, and N,N-dimethyl (meth)acrylamide; and amino-group-containing unsaturated monomers, such as N,N-dimethylaminoethyl (meth)acrylate, N,N-dimethylaminopropyl (meth)acrylate, and N,N-dimethylaminopropyl(meth)acrylamide. These monomers may be used either alone respectively or fitly in combinations with each other. However, from the viewpoint of the performance and cost of the water-absorbent resin as obtained, it is favorable to use acrylic acid and/or its salts (e.g. salts of such as sodium, lithium, potassium, ammonium, and amines; above all, the sodium salt is favorable from the viewpoint of the cost) as a major component. The acrylic acid and/or its salts is more favorably used in a ratio of not less than 70 mol %, still more favorably not less than 80 mol %, yet still more favorably not less than 90 mol %, particularly favorably not less than 95 mol %, relative to the entire monomer component.

In the above polymerization step, there can be used internal-crosslinking agents. As such internal-crosslinking agents, there can be used internal-crosslinking agents which have hitherto publicly been known. Specifically, examples thereof include: N,N'-methylenebis(meth)acrylamide, (poly)ethylene glycol di(meth)acrylate, (poly)propylene glycol di(meth)acrylate, trimethylolpropane tri(meth)acrylate, glycerol tri(meth)acrylate, glycerol acrylate methacrylate, ethylene-oxide-modified trimethylolpropane tri(meth)acrylate, pentaerythritol hexa(meth)acrylate, triallyl cyanurate, triallyl isocyanurate, triallyl phosphate, triallylamine, poly(meth)allyloxyalkanes, (poly)ethylene glycol diglycidyl ether, glycerol diglycidyl ether, ethylene glycol, polyethylene glycol, propylene glycol, glycerol, pentaerythritol, ethylenediamine, ethylene carbonate, propylene carbonate, polyethylenimine, and glycidyl (meth)acrylate; or internal-crosslinking agents as described in page 4 of JP-A-182750/1998. Of these internal-crosslinking agents, at least one internal-crosslinking agent can be used in consideration of its reactivity. Of the above, it is favorable to essentially use a compound having at least two polymerizable unsaturated groups. The amount of the internal-crosslinking agents as used can fitly be determined depending upon requested properties of the water-absorbent resin.

Although there is no especial limitation on the concentration of the monomer component in the polymerization step, yet this concentration is favorably in the range of 30 to 70 weight %, more favorably 40 to 60 weight %. There is a tendency such that: the productivity is lowered in the case where the concentration is less than 30 weight %, and the absorption capacity is lowered in the case where the concentration is more than 70 weight %.

There is no especial limitation on the neutralization ratio of the acid-group-containing monomer. However, this neutralization ratio is favorably in the range of 50 to 90 mol %, more favorably 50 to 80 mol %, taking it into consideration that the non-necessity of the neutralization step following the polymerization step is desired for uses having a possibility of contacting with human bodies, such as sanitary articles.

In the polymerization step, such as hydrophilic polymers (e.g. starch, derivatives from starch, cellulose, derivatives from cellulose, poly(vinyl alcohol), poly(acrylic acid (salts)), and crosslinked products of poly(acrylic acid (salts))), chain transfer agents (e.g. hypophosphorous acid (salts)), and chelating agents may be added to the reaction system.

There is no especial limitation on the polymerization method for the above monomer component. However, an aqueous solution polymerization method is favorable. Specific examples thereof include: a static polymerization method that involves carrying out the polymerization of an aqueous monomer solution in a stationary state; and a stirring polymerization method that involves carrying out the polymerization in a stirring apparatus. In the static polymerization method, endless belts are favorably used. In the stirring polymerization method, single-shaft stirring apparatuses can also be used, but stirring apparatuses as equipped with at least two stirring shafts (e.g. kneaders) are favorably used.

The polymerization step is usually carried out under an ordinary pressure, but it is also a favorable mode that the polymerization step is carried out while water is distilled off under a reduced pressure in order to lower the boiling temperature of the polymerization system. The polymerization step is carried out under an ordinary pressure more favorably for such as easiness of operation.

There is no especial limitation on the polymerization initiator usable in the above polymerization step. Usable are such as thermal initiators (e.g. persulfate salts, such as sodium persulfate, potassium persulfate, and ammonium persulfate; peroxides, such as hydrogen peroxide, t-butyl peroxide, and methyl ethyl ketone peroxide; and azo compounds, such as azonitrile compounds, azoamidine compounds, cyclic azoamidine compounds, azoamide compounds, alkylazo compounds, 2,2'-azobis(2-amidinopropane) dihydrochloride, and 2,2'-azobis[2-(2-imidazolin-2-yl)propane] dihydrochloride) and photoinitiators (e.g. benzoin derivatives, benzyl derivatives, acetophenone derivatives, benzophenone derivatives, and azo compounds). The persulfate salts are favorable from the viewpoint of the cost and the ability to lower residual monomers. In addition, the use of the photoinitiators and ultraviolet rays is also a favorable method. It is also possible that these polymerization initiators are used jointly with and combined with reducing agents that promote their decomposition, thus using them as redox initiators.

Examples of the above reducing agents include: (bi) sulfurous acid (or its salts) such as sodium sulfite and sodium hydrogensulfite; L-ascorbic acid (or its salts); reducible metals (or their salts) such as ferrous salts; and amines, but the reducing agents are not especially limited thereto. It is more favorable to use the photoinitiators and the thermal initiators together.

The polymerization initiation temperature is usually in the temperature range of favorably 10 to 105° C., more favorably 15 to 100° C., still more favorably 20 to 95° C. In the case where the polymerization initiation temperature is lower than 10° C., there is a tendency such that: not only the productivity is lowered because of prolonging the induction period and the polymerization time but also the properties of the water-absorbent resin are lowered. In the case where the polymerization initiation temperature is higher than 105° C., there is an unfavorable possibility that: the polymerization is difficult to control, so that the properties of the polymer as obtained are lowered.

The highest temperature during the polymerization step is favorably not higher than 120° C., more favorably not higher than 115° C., still more favorably not higher than 110° C. In the case where the highest temperature is higher than 120° C., the properties of the polymer (hydropolymer, base polymer, and water-absorbent resin) as obtained tend to be remarkably lowered.

There is no especial limitation on the polymerization time. However, it is favorably not longer than 30 minutes, more favorably not longer than 10 minutes. In the case where the polymerization time is longer than 30 minutes, there are disadvantages in that the productivity of the polymer (hydropolymer, base polymer, and water-absorbent resin) as obtained is lowered.

In a favorable example of the polymerization method, the temperature of the system rapidly rises after the initiation of the polymerization and then reaches a boiling point at a low polymerization conversion of such as 10 to 20 mol % to emit water vapor to increase the solid component concentration, while the polymerization goes on. The heat of the polymerization is effectively utilized to thereby increase the solid component concentration. Therefore, it is desirable to suppress the heat radiation from a material-contacting portion of the polymerization vessel to the utmost. As to the material composing the polymerization vessel, there is favorably used a polymerization vessel such that a material-noncontacting portion made of resin, rubber, or stainless steel is covered with a heat-retaining material or heated with a jacket. There is a case where the water vapor as emitted from the system contains the monomer, and therefore, in such a case, it is desirable to recover and then use this monomer. Particularly, it is favorable that the acrylic acid and/or water as vaporized during the polymerization step are collected and then recycled. The recovery ratio of the acrylic acid is favorably not less than 1 weight %, more favorably not less than 2 weight %, still more favorably not less than 3 weight %, of the weight of the entire acrylic acid as used (before the neutralization step).

In the present invention, it is important that the water content of the hydropolymer in the pulverization step is in the range of 10 to 30 weight %, favorably 10 to 25 weight %, more favorably 10 to 20 weight %, still more favorably 10 to 18 weight %, particularly favorably 10 to 18 weight % (but excluding 18 weight %). That is to say, it is favorable that the hydropolymer as obtained by the above polymerization step has already had a solid component concentration of 70 to 90 weight % immediately after the above polymerization step. However, in the present invention, it is sufficient if the water content is within the above range in the pulverization step. Therefore, even if the solid component concentration of the hydropolymer is not within the above range immediately after the above polymerization step, the water content may be adjusted by drying this hydropolymer or by adding water thereto.

As to such an adjustment method for the water content, in the case of the drying, for example, (1) a hydropolymer having a low solid content is dried, whereby the water content is adjusted into the range of 10 to 30 weight % (whereby the solid content is adjusted into the range of 70 to 90 weight %), or (2) a hydropolymer is pulverized while being heated, whereby the water content of the hydropolymer is adjusted into the range of 10 to 30 weight % in the pulverization step. On the other hand, in the case of the addition of water, for example, (1) water is added to a polymerized and dried polymer or this polymer is allowed to absorb moisture, whereby the water content is adjusted into the range of 10 to 30 weight %, or (2) a polymer is pulverized while water is added thereto in the pulverization step, whereby the water content is adjusted into the range of 10 to 30 weight %. In the case of the addition of water, it is also possible that a surface-crosslinking agent for further enhancing the water absorption performance of an internal-crosslinked polymer is added together with the water.

Favorable of the above adjustment methods for the water content is the method including the step of drying a hydropolymer having a low solid content, whereby the water content is adjusted into the range of 10 to 30 weight % (whereby the solid content is adjusted into the range of 70 to 90 weight %); and more favorable is a method including the step of drying a hydropolymer of a water-absorbent resin having a water content of more than 30 weight %, whereby the water content is adjusted into the range of 10 to 30 weight %; and still more favorable is a method including the step of drying a hydropolymer of a water-absorbent resin having a water content of not less than 30 weight %, whereby the water content is adjusted into the range of 10 to 25 weight %; and yet still more favorable is a method including the step of drying a hydropolymer of a water-absorbent resin having a water content of not less than 30 weight %, whereby the water content is adjusted into the range of 10 to 20 weight %; and yet still more favorable is a method including the step of drying a hydropolymer of a water-absorbent resin having a water content of not less than 30 weight %, whereby the water content is adjusted into the range of 10 to 18 weight %; and particularly favorable is a method including the step of drying a hydropolymer of a water-absorbent resin having a water content of not less than 30 weight %, whereby the water content is adjusted into the range of 10 to 18 weight % (but excluding 18 weight %).

As to the mixing and/or reaction with the surface-crosslinking agent, it may be carried out at the same time as the pulverization step, or it may be carried out to a particulate hydropolymer after the pulverization step, or it may be carried out to a particulate polymer after the drying step.

The surface-crosslinking agent usable in the present invention is used without limitation if it is reactable with a functional group of the water-absorbent resin, and crosslinking agents (surface-crosslinking agents) as conventionally used for such uses are usable. Examples of the usable surface-crosslinking agents include at least one member selected from the group consisting of: polyhydric alcohol compounds, such as ethylene glycol, propylene glycol, polyethylene glycol, polypropylene glycol, 1,3-propanediol, glycerol, polyglycerol, 1,4-butanediol, 1,6-hexanediol, trimethylolpropane, diethanolamine, triethanolamine, polyoxypropylene, oxyethylene-oxypropylene block copolymers, pentaerytiritol, and sorbitol; epoxy compounds, such as ethylene glycol diglycidyl ether, polyethylene glycol diglycidyl ether, glycerol polyglycidyl ether, polyglycerol polyglycidyl ether, propylene glycol diglycidyl ether, polypropylene glycol diglycidyl ether, and glycidol; haloepoxy compounds such as epichlorohydrin; polyamine compounds, such as ethylenediamine, diethylenetriamine, triethylenetetramine, polyamidopolyamine, polyallylamine, and polyethylenimine, and condensed products between these polyamine compounds and the haloepoxy compounds; polyisocyanate compounds, such as 2,4-tolylene diisocyanate and hexamethylene diisocyanate; polyoxazoline compounds such as 1,2-ethylenebisoxazoline; silane coupling agents, such as γ-glycidoxypropyltrimethoxysilane and γ-aminopropyltrimethoxysilane; alkylene carbonate compounds, such as 1,3-dioxolan-2-one, 4-methyl-1,3-dioxolan-2-one, and 1,3-dioxopan-2-one, and polyalkylene carbonate compounds such as ethylene glycol bis(4-methylene-1,3-dioxolan-2-one) ether; mono-, di-, or polyoxazolidinone compounds; oxetane compounds such as 3-methyl-3-oxetane methanol, and polyoxetane compounds; and polyaziridine compounds such as 2,2-bishydroxymethylbutanol-tris[3-(1-aziridinyl)propionate]. Favorable of these surface-crosslinking agents is at least one member selected from the group consisting of the polyhydric alcohols, the epoxy compounds, and the alkylene carbonate compounds.

In the present invention, the hydropolymer having a water content of 10 to 30 weight %, which is obtained by the above method, is pulverized. Hereupon, what is referred to as the hydropolymer in the present specification means a polymer having a water content of not less than 10 weight %, and what is referred to as the dried polymer means a polymer having a water content of less than 10 weight %. In the case of the dried polymer having a water content of less than 10 weight %, the brittleness of this polymer is so excessively high that a fine powder is easily formed by the power as applied in the pulverization step. Therefore, the productivity is sacrificed if it is arranged that the amount of the fine powder resultant from the pulverization step should be reduced, but the fine powder is formed in a large amount if the productivity is thought much of. On the other hand, in the case where the water content is more than 30 weight %, a hydropolymer having little brittleness and having strong tackiness and plasticity is formed. Therefore, the pulverization step is difficult to carry out, and the pulverization efficiency is lowered, and the particle diameter as a result of the pulverization step also increases, and coarse particles are formed in a large amount. That is to say, a state where the hydropolymer has a water content of 10 to 30 weight % is the best-balanced one, and is favorable because: the pulverizability is also good in the pulverization step, and the amount of the fine powder as formed and the amount of the coarse particles as formed both decrease. More favorable is a state where the hydropolymer has a water content of 10 to 25 weight %, still more favorably 10 to 20 weight %, yet still more favorably 10 to 18 weight %, particularly favorably 10 to 18 weight % (but excluding 18 weight %).

Though depending upon conditions in the pulverization step, usually the water content of the particulate hydropolymer resultant from the pulverization step tends to be less than that of the hydropolymer before the pulverization step because of the increase of the surface area and the generation of heat during the pulverization step. Accordingly, there is also a case where the water content of the particulate hydropolymer resultant from the pulverization step is in the range of 5 to 30 weight % (including less than 10 weight %). However, there are disadvantages in that the fine powder tends to increase under conditions where the water content of the particulate hydropolymer resultant from the pulverization step will be less than 5 weight %.

As to the pulverizers as used, there can be favorably used those which are classified into shearing-type rough crushers, impact crushers, and high-speed-rotation-type pulverizers among the pulverizer names as classified in Table 1.10 of *Powdery Engineering Handbook* (the first edition, edited by the Powdery Engineering Society), and which are equipped with at least one mechanism selected from among pulverization mechanisms of such as cutting, shearing, impact, and friction. Of the pulverizers corresponding to these kinds of pulverizers, there can be particularly favorably used pulverizers as equipped with the cutting mechanism and the shearing mechanism as major mechanisms. As to pulverizers which are classified into roll-tumbling-types or roll mills (roll-rotating-types) as the pulverizer names and are further equipped with a compression mechanism as a pulverization mechanism, they can be used in the case where the shearing and cutting effects are strong, but they sometimes cannot be used in the case where: the shearing and cutting effects are weak but the compression effect is strong. In addition, pulverizers such as compression pulverizers and powder-layer-hammering types have the compression mechanism as a major pulverization mechanism and are therefore not used. The reason therefor is because the hydropolymer is difficult to crush by the compression. In addition, pulverizers such as autogenous tumbling mills and ball-medium mills have almost no shearing or cutting mechanism, either, and are therefore not used.

Furthermore, more favorable of the above favorable pulverizers are apparatuses which make the pulverization by shearing with a plurality of rotary blades and fixed blades. In addition, the peripheral speed of the above rotary blades is favorably in the range of 3.0 to 200 m/sec, more favorably 5.0 to 150 m/sec. In the case where the peripheral speed of the rotary blades is slower than 3.0 m/sec, there is a tendency such that: the amount as treated is extremely lowered, and further the particle diameter as a result of the pulverization increases, and the kneading of materials also increases to cause the increase of the extractable content. On the other hand, in the case where the peripheral speed of the rotary blades is faster than 200 m/sec, the amount as treated increases, but there are disadvantages in that the cost of apparatuses rises. Even in the pulverization with such high-speed rotary blades, the hydropolymer having the water content in the range according to the present invention generate almost no fine powder, and its pulverization efficiency is also high, therefore resulting in very high productivity.

Furthermore, although not especially limited, pulverizers as equipped with a screen are favorable among the above-mentioned pulverizers. Incidentally, the screen as equipped to such favorable pulverizers is not involved in the above sieving classification procedure. As to the screen mesh opening size, there may be fitly be adopted such as efficiently gives pulverized particles with particle diameters of smaller than 850 μm, but there is usually used a screen having a screen mesh opening size of favorably not larger than 2.0 mm in diameter, more favorably not larger than 1.5 mm in diameter, still more favorably not larger than 1.0 mm in diameter. In the case of desiring to obtain a large amount of particles having a narrower particle diameter range of 150 to 600 μm (but excluding 600 μm) particularly of the range of 150 to 850 μm (but excluding 850 μm), there is favorably used a screen having a screen mesh opening size of not larger than 1.0 mm.

Favorable as pulverizers without any screen are, for example, disc-mill-type pulverizers (for example, which correspond to the below-mentioned turbo grinders) which make the pulverization with a plurality of blades (grooves) as formed on a rotary disc and a plurality of blades (grooves) as formed on a disc facing the rotary disc. As to their clearance (e.g. the shortest of the intervals of the blades as formed on the rotary disc with the blades as formed on the disc facing the rotary disc), there may be fitly adopted such as efficiently gives the pulverized particles with particle diameters of smaller than 850 μm, but the clearance is usually set favorably at not more than 1 mm, more favorably at not more than 0.7 mm, still more favorably at not more than 0.5 mm.

Furthermore, continuous-supplying-type pulverizers are favorably used among the pulverizers. In addition, the closed-circuit pulverization system is adopted in the case where the pulverized particles include a small amount of particles with particle diameters that are larger than the predetermined particle diameter.

In the case where the unpulverized hydropolymer is continuously obtained in a thick-plate or sheet shape by such as belt continuous polymerization, it is not impossible to pulverize the hydropolymer at a stretch directly into the particles with particle diameters of smaller than 850 μm. However, it is usually favorable that the hydropolymer is disintegrated (small divided) into roughly pulverized shapes of such as blocks, sheet pieces, and coarse particles. This disintegration can also be carried out with the above pulverizers. Although not especially limited, the extent of this disintegration is usually favorably set so as to have a length within 100 times, more favorably within 50 times, of the screen mesh opening size or the clearance.

In the present invention, the hydropolymer having a specific water content range of 10 to 30 weight % is pulverized with the pulverizer, and therefore there can be obtained the particulate water-absorbent resin with high productivity by a production process that is carried out in such a manner that the particulate water-absorbent resin will contain particles with particle diameters of 150 to 850 μm (but excluding 850 μm) in an amount of not smaller than 75 weight % of the particulate water-absorbent resin after the pulverization step or after the pulverization step and the drying step even if the adjustment of the particle diameters is not carried out by the sieving classification procedure. The amount of the particles with particle diameters of 150 to 850 μm (but excluding 850 μm) is favorably not smaller than 80 weight % (more favorably not smaller than 82 weight %) of the particulate water-absorbent resin after the pulverization step or after the pulverization step and the drying step.

In the present invention, the fine particles in the particulate water-absorbent resin, after the pulverization step or after the pulverization step and the drying step, are sufficiently reduced, and the amount of the fine particles with particle diameters of smaller than 150 μm is favorably not larger than 15 weight % (more favorably not larger than 13 weight %, still more favorably not larger than 11 weight %) of the particulate water-absorbent resin after the pulverization step or after the pulverization step and the drying step.

In the present invention, the superfine particles in the particulate water-absorbent resin, after the pulverization step or after the pulverization step and the drying step, are sufficiently reduced, and the amount of the superfine particles with particle diameters of smaller than 106 μm is favorably not larger than 10 weight % (more favorably not larger than 7 weight %, still more favorably not larger than 5 weight %) of the particulate water-absorbent resin after the pulverization step or after the pulverization step and the drying step.

In the present invention, the coarse particles in the particulate water-absorbent resin, after the pulverization step or after the pulverization step and the drying step, are sufficiently reduced, and the amount of the coarse particles with particle diameters of not smaller than 850 μm is favorably not larger than 10 weight % (more favorably not larger than 7 weight %, still more favorably not larger than 5 weight %) of the particulate water-absorbent resin after the pulverization step or after the pulverization step and the drying step.

In the present invention, the yield of particles having a narrow particle diameter range in the particulate water-absorbent resin, after the pulverization step or after the pulverization step and the drying step, becomes higher than conventional, and the amount of the particles with particle diameters of 150 to 600 μm (but excluding 600 μm) is favorably not smaller than 40 weight % (more favorably not smaller than 50 weight %, still more favorably not smaller than 55 weight %) of the particulate water-absorbent resin after the pulverization step or after the pulverization step and the drying step.

Specific examples of the pulverizers or the cutting-shearing mills usable in the present invention are cited as follows:

Vertical pulverizer (VERTICAL CUTTING MILL, Orient Co., Ltd.);
Rotoplex (ROTOPLEX, Hosokawa Micron Co., Ltd.);
Turbo cutter (TURBO CUTTER, Turbo Industry Co., Ltd.);
Turbo grinder (TURBO GRINDER, Turbo Industry Co., Ltd.);
Tyre shredder (TYRE SHREDDER, Masuno Seisakusho Co., Ltd.);
Rotary cutter mill (ROTARY CUTTER MILL, Yoshida Seisakusho Co., Ltd.);
Cutter mill (CUTTER MILL, Tokyo Atomizer Production Co., Ltd.);
Disc mill (DISC MILL, PALLMANN Maschinenfabrik GmbH & Co.);
Shred crusher (SHRED CRUSHER, Tokyo Atomizer Production Co., Ltd.);
Cutter mill (CUTTER MILL, Masuko Sangyo Co., Ltd.);
Crusher (CRUSHER, Masuko Sangyo Co., Ltd.);
Rotary cutter mill (ROTARY CUTTER MILL, Nara Kikai Seisakusho Co., Ltd.);
Gainax crusher (GAINAX CRUSHER, Horai Co., Ltd.);
U-com (U-COM, Horai Co., Ltd.);
Meshmill (MESHMILL, Horai Co., Ltd.); and
Disc cutter (Horai Co., Ltd.).

In the present invention, when the hydropolymer having a water content of 10 to 30 weight %, which is obtained by the above method, is pulverized, the ventilation (blowing) of the inside of the pulverizer with a gas, favorably, dry air, low-humidity air, hot air, or their combinations, is favorably carried out. In the pulverization step, water vapor as emitted from the hydropolymer condenses in the apparatus, thereby facilitating the adhesion of the hydropolymer to the inside of the apparatus and the clogging of the apparatus with the hydropolymer, but it can be considered that the ventilation (blowing) prevents such phenomena from occurring.

Incidentally, in the disintegration or pulverization step, surfactants as described in JP-A-188726/1999 (Nippon Shokubai Co., Ltd.) may be added. However, in the solid component concentration range of the hydropolymer in the present invention, there is almost no necessity of the addition of the surfactants if the inner atmosphere of the machine during the pulverization step is put in such a state as mentioned above where the hydropolymer may not absorb moisture.

The temperature of the hydropolymer is favorably in the range of 30 to 100° C. (more favorably 35 to 90° C., still more favorably 40 to 80° C.) during the pulverization step in the present invention. In the case where the temperature is higher than 100° C., there is a tendency such that: the hydropolymer has so excessively high tackiness as to be difficult to pulverize, and therefore the coarse particles are also easily formed. In the case where the temperature is lower than 30° C., there is a tendency such that: the hydropolymer is so excessively hard as to be difficult to pulverize, and further the brittleness of the hydropolymer is so high that the fine powder is easily formed. In addition, from the viewpoint of the glass transition temperature of the hydropolymer, the hydropolymer is favorably pulverized above a temperature that is lower than the glass transition temperature by 10° C., more favorably at not lower than the glass transition temperature.

In the present invention production process, there may be classified a small amount of fine powder or coarse particles that may be contained in the particulate hydropolymer after the pulverization step. The classified fine powder or coarse particles contain water. Therefore, there are merits such that: it becomes hardly necessary to add water to a monomer or a hydrogel when the classified fine powder or coarse particles are recovered or granulated to reuse them; and fisheyes occur little even if the water is added, and therefore the handling property is excellent.

In the present invention production process, there may be dried the particulate hydropolymer after the pulverization step. There is no especial limitation on the drying method. However, there is favorably used a drying method which involves making the materials sufficiently contact with hot air or a heat transfer face while the materials are moved, such as an agitation drying method, a fluidized-bed drying method, and a gas-flowing drying method.

In the present invention production process, the subsequent handling of the pulverized hydropolymer (particulate hydropolymer) can be selected from among the following methods:

(1) The particulate hydropolymer is, as it is, made into a product: the particulate hydropolymer is, as it is, provided to uses such as sanitary articles and agricultural and horticultural uses. The particulate hydropolymer may be mixed with finely particulate inorganic substances (e.g. bentonite, zeolite, and silicon oxide) for the purpose of enhancing the flowability of the particles.

(2) The particulate hydropolymer is mixed with the surface-crosslinking agent to carry out their reaction, and then made into a product as it is in a state of containing water: the energy for evaporating water is unnecessary. The particulate hydropolymer may be mixed with finely particulate inorganic substances (e.g. bentonite, zeolite, and silicon oxide) for the purpose of enhancing the flowability of the particles.

(3) The particulate hydropolymer is mixed with the surface-crosslinking agent to carry out their reaction, and then dried, and then made into a product: the heating energy for the drying can be combined with the energy for the surface-crosslinking reaction.

(4) The particulate hydropolymer is dried and then, as it is, made into a product.

(5) The particulate hydropolymer is dried, and then pulverized and classified, and then made into a product.

(6) The particulate hydropolymer is dried, and then pulverized, classified and surface-crosslinked, and then made into a product.

The present invention particulate water-absorbent resin can favorably be obtained by the present invention production process as mentioned above. Needless to say, the present invention particulate water-absorbent resin is not limited to the water-absorbent resin as obtained by the present invention production process. Hereupon, as is aforementioned, as to the particulate water-absorbent resin as mentioned in the present invention, there are some cases where it is a particulate hydropolymer itself as obtained by the pulverization step, and there are other cases where it is a product as obtained by further carrying out some step (e.g. surface-crosslinking step, drying step, additional pulverization step, or classification step) to the particulate hydropolymer as obtained by the pulverization step.

That is to say, the present invention particulate water-absorbent resin is a particulate water-absorbent resin which displays an absorption capacity of 25 to 50 g/g without load and an absorption capacity of not less than 25 g/g under a load, and is obtained by a production process that is carried out in such a manner that the particulate water-absorbent resin will contain particles with particle diameters of 150 to 850 μm (but excluding 850 μm) in an amount of not smaller than 75 weight % of the particulate water-absorbent resin after the pulverization step or after the pulverization step and the drying step, wherein the production process for obtaining the particulate water-absorbent resin includes: the pulverization step of pulverizing a hydropolymer of a water-absorbent resin having a water content of 10 to 30 weight % with a pulverizer; and the step of, at the same time as the pulverization step, mixing a surface-crosslinking agent or, at the same time as the pulverization step, mixing a surface-crosslinking agent to thereby carry out a crosslinking reaction.

The absorption capacity without load (GV) of the present invention particulate water-absorbent resin is favorably in the range of 20 to 60 (g/g), more favorably 25 to 55 (g/g), still more favorably 25 to 50 (g/g). There are disadvantages in that: the absorption amount is not sufficient in the case where the absorption capacity without load is less than 20 (g/g), and the practical gel strength is not obtained in the case where the absorption capacity without load is more than 60 (g/g).

The absorption capacity under a load (AAP) of the present invention particulate water-absorbent resin is favorably not less than 20 (g/g), more favorably not less than 25 (g/g), still more favorably not less than 30 (g/g), particularly favorably not less than 35 (g/g). In the case where the absorption capacity under a load is less than 20 (g/g), there are disadvantages in that the favorable performance is not displayed when the water-absorbent resin as obtained is used in a high concentration for sanitary articles.

The present invention particulate water-absorbent resin is a particulate water-absorbent resin in which the yield of particles having a narrow particle diameter range is high and further the fine powder and the coarse particles are sufficiently reduced, and further this particulate water-absorbent resin is excellent also in absorption properties. Therefore, this particulate water-absorbent resin can favorably be used for sanitary materials as aimed at such as absorption of excrements, urine, and blood (e.g. disposable diapers, sanitary napkins, and adult incontinent products).

(Effects and Advantages of the Invention):

The present invention production process for a particulate water-absorbent resin can easily give the particulate water-absorbent resin with high productivity in such a manner that the particulate water-absorbent resin will contain particles with particle diameters of 150 to 850 μm (but excluding 850 μm) in an amount of not smaller than 75 weight % of the particulate water-absorbent resin after the pulverization step or after the pulverization step and the drying step even if the adjustment of the particle diameters is not carried out by the sieving classification procedure. More favorably, this production process can easily give a particulate water-absorbent resin with high productivity wherein the particulate water-absorbent resin contains fine particles with particle diameters of smaller than 150 μm in an amount of not larger than 15 weight % of the particulate water-absorbent resin or superfine particles with particle diameters of smaller than 106 μm in an amount of not larger than 10 weight % of the particulate water-absorbent resin.

The present invention particulate water-absorbent resin is a particulate water-absorbent resin in which the yield of particles having a narrow particle diameter range is high and further the fine powder and the coarse particles are sufficiently reduced, and further this particulate water-absorbent resin is excellent also in absorption properties. Therefore, this particulate water-absorbent resin can favorably be used for sanitary materials as aimed at such as absorption of excrements, urine, and blood (e.g. disposable diapers, sanitary napkins, and adult incontinent products).

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to these examples.

In the examples and the comparative examples, unless otherwise noted, the unit "part(s)" denotes "part(s) by weight".

Incidentally, the water content of the hydropolymer, the particle diameter distribution of the particulate hydropolymer, and the water absorption performance of the water-absorbent resin were measured in the following ways.

[Measurement of Water Content of Hydropolymer]:

An amount of 5 g of hydropolymer was put on a Petri dish just before the treatment with a pulverizer or after the pulverization step, and then dried in a drying oven of 180° C. for 24 hours to calculate its water content in accordance with the following equation.

$$\text{Water content(weight \%)} = [\{(\text{weight (g) of hydropolymer before drying}) - (\text{weight (g) of hydropolymer after drying})\} / (\text{weight (g) of hydropolymer before drying})] \times 100$$

[Measurement of Particle Diameter Distribution of Particulate Hydropolymer]:

Approximately 300 g of particulate hydropolymer was placed into a plastic bag, and thereafter 1 g of Aerosil R-972 (hydrophobic finely particulate silicon oxide produced by Nippon Aerosil Co., Ltd.) was added thereto to mix and sufficiently loosen them by hand, and the resultant product was shaken with JIS standard sieves of 20 cm in inner diameter (those which had mesh opening sizes of 850 μm, 600 μm, 300 μm, 150 μm, and 106 μm respectively were used) and a Ro-Tap type sieve shaker (IIDA Sieve Shaker)

at room temperature of 23±2° C. under a relative humidity of 45 to 50% for 10 minutes.

Depending upon such as surface conditions of the particulate hydropolymer, there was a case where: the particulate hydropolymer aggregated during the above sieve-shaking step, and therefore the accurate measurement of the particle diameter distribution was difficult. Accordingly, the measurement was carried out while the reaggregation of the particulate hydropolymer was inhibited by the addition of the Aerosil R-972.

[Measurement of Absorption Capacity without Load (GV)]:

An amount of 0.2 g of water-absorbent resin was uniformly placed into a nonwoven-fabric-made bag (60 mm×60 mm), and then its opening portion was heat-sealed. Thereafter, the bag was immersed into a 0.9 weight % aqueous sodium chloride solution (physiological saline) under room temperature (23±2° C.). The bag was pulled up after 30 minutes, and then drained of water at 250×9.81 m/s$^2$ (250 G) with a centrifugal separator for 3 minutes, and then the weight W1 (g) of the bag was measured. The same procedure was carried out without using the water-absorbent resin, and then the weight W0 (g) of the bag was measured. Then, the GV (absorption capacity without load) was calculated from these weights W1 and W0 in accordance with the following equation.

$GV$ (g/g)={(weight $W1$ (g)–weight $W0$ (g))/weight (g) of water-absorbent resin}–1

[Measurement of Absorption Capacity under Load (AAP)]:

An amount of 0.9 g of water-absorbent resin was uniformly spread on a stainless wire net of 400 meshes (mesh opening size: 38 μm) as attached by fusion to the bottom of a plastic supporting cylinder having an inner diameter of 60 mm. Then, on this water-absorbent resin, there were mounted a piston and a load in sequence, wherein: the piston had an outer diameter of only a little smaller than 60 mm and made no gap with the inner surface of the supporting cylinder, but was not hindered from moving up and down, and the total weight of the piston and the load was adjusted to 565 g in order that a load of 20 g/cm$^2$ (corresponding to 1.96 kPa) could be uniformly applied to the water-absorbent resin. Then, the weight (Wa (g)) of the resultant one set of measurement apparatus was measured.

A glass filter having a diameter of 90 mm (opening diameter No. 1) was mounted inside a Petri dish having a diameter of 150 mm, and then a 0.9 weight % aqueous NaCl solution was added under room temperature (23±2° C.) up to the same level as the surface of the glass filter, on which a filter paper having a diameter of 90 mm (produced by ADVANTEC TOYO Co., Ltd., opening diameter No.2) was then mounted such that its entire surface would be wetted, and the excessive liquid was removed.

The above one set of measurement apparatus was mounted on the above wet filter paper, thereby allowing the water-absorbent resin to absorb the liquid under a load. After 1 hour, the one set of measurement apparatus was lifted and removed, and then its weight (Wb (g)) was measured again.

The absorption capacity under the load (AAP) was calculated in accordance with the following equation.

$AAP$ (g/g)=($Wb$ (g)–$Wa$ (g))/0.9 (g)

EXAMPLE 1

A styrene-foam-made lid, as equipped with a nitrogen-introducing tube, an exhaust tube, and a thermometer, was attached to a stainless beaker having an inner diameter of 10 cm, and further the entire stainless beaker was covered with styrene foam as a heat insulator. Into this beaker, there was placed 40.6 g of 80 weight % aqueous acrylic acid solution in which 0.09 g of polyethylene glycol diacrylate (number-average molecular weight: 478) was dissolved. Under stirring with a magnetic stirrer, a solution as obtained by diluting 28.2 g of 48 weight % aqueous sodium hydroxide solution with 31.0 g of ion-exchanged water was added thereto to thereby carry out neutralization. The internal temperature reached 90° C. The neutralization ratio of the resultant aqueous monomer solution was 75 mol %. While nitrogen was introduced thereinto, 0.45 g of 10 weight % aqueous sodium persulfate solution was added thereto. As a result, polymerization was immediately initiated (polymerization initiation temperature: 90° C.), and then the reaction mixture reached the polymerization peak temperature (108° C.) while emitting water vapor. The time as required from the addition of the aqueous sodium persulfate solution until the reach to the polymerization peak temperature, that is, the polymerization time, was 2 minutes. Still after the reach to the polymerization peak temperature, the reaction mixture was retained as it was in a heat-retained state for 5 minutes, and thereafter the resultant hydropolymer was taken out. Thus, 7 minutes were required from the addition of the polymerization initiator until the taking-out of the hydropolymer. The hydropolymer as taken out was divided by scissors into small pieces having diameters of about 2 mm to about 4 mm. This procedure was repeated, thereby producing a small-divided hydropolymer in a considerably large amount. The small-divided hydropolymer was dried for a predetermined time with a hot-air drying oven of 170° C., thus obtaining a hydropolymer having a water content of 29.1 weight %.

The hydropolymer as obtained was pulverized with a vertical pulverizer (model No. VM27-S, produced by Orient Co., Ltd.) at a peripheral speed of rotary blades of 7 m/sec wherein the vertical pulverizer was equipped with a screen having a mesh opening size of 1.5 mm in diameter. The temperature of the hydropolymer was about 50° C. during this pulverization step.

There was measured the particle diameter distribution of the pulverized product (particulate hydropolymer) as obtained, so that it was as shown in Table 1.

EXAMPLE 2 TO 5

Particulate hydropolymers were obtained in the same way as of Example 1 except to change the drying time of the small-divided hydropolymer to thereby adjust the water content of the hydropolymers to those shown in Table 1. Their respective particle diameter distributions were as shown in Table 1.

COMPARATIVE EXAMPLES 1 AND 2

Particulate hydropolymers were obtained in the same way as of Example 1 except to change the drying time of the small-divided hydropolymer to thereby adjust the water content of the hydropolymers to 34.1 weight % and 6.0 weight % respectively as shown in Table 1. Their respective particle diameter distributions were as shown in Table 1.

From comparison with Examples 1 to 5, it would be understood that: in the case where the water content of the hydropolymer is 34.1 weight %, there is seen the decrease of the yield of the particles having a particle diameter range of 150 to 850 μm (but excluding 850 μm), and further there is seen the increase of the occurrence of the coarse particles with particle diameters of not smaller than 850 μm. In addition, it would be understood that: in the case where the water content of the hydropolymer is 6.0 weight %, there is seen the increase of the occurrence of what is called fine powder such as the fine particles with particle diameters of smaller than 150 μm and the superfine particles with particle diameters of smaller than 106 μm.

EXAMPLE 6

A solution (A) and an aqueous NaOH solution (B) were each prepared, wherein the solution (A) was obtained by mixing 424 g of acrylic acid, 0.35 g of polyethylene glycol diacrylate (number-average molecular weight: 478), and 0.064 g of 2-hydroxy-2-methyl-1-phenylpropan-1-one, and wherein the aqueous NaOH solution (B) was prepared by mixing 424 g of 48.5 weight % aqueous NaOH solution and 240 g of ion-exchanged water. Then, they were deaerated under a nitrogen gas atmosphere for 30 minutes. The (A) and the (B) were mixed together at a stretch under stirred conditions, thereby obtaining a monomer solution of which the liquid temperature was raised to about 95° C. due to the resultant heat of neutralization and heat of dissolution. Furthermore, 10.9 g of 2 weight % aqueous sodium persulfate solution was added to this monomer solution, and then they were stirred for a few seconds and immediately thereafter poured under an open system into a stainless-steel-made container having a bottom of 390×550 mm, wherein: the container was put on a hot plate of 90° C., and to the inner surface of this container there was attached a tape of Teflon (registered trade mark). Then, the polymerization was immediately initiated by ultraviolet-ray irradiation with a black-light mercury lamp (model No. H400BL, produced by Toshiba Lighting & Technology Corporation). The polymerization went on while the polymerizing mixture swelled and foamed in all directions along with emission of water vapor. Thereafter, the mixture contracted to the size almost equal to the initial size. At the completion of the ultraviolet-ray irradiation for 2 minutes, the resultant thin-sheet hydropolymer was taken out. Subsequently, this hydropolymer was disintegrated (small divided) with a cutter mill (U-280, Horai Co., Ltd.) as equipped with a screen having a mesh opening size of 10 mm in diameter, thus obtaining a roughly disintegrated hydropolymer having a temperature of about 35° C. and particle diameters of about 2 to about 5 mm. This hydropolymer had a water content of 29 weight %.

The hydropolymer as obtained was immediately pulverized at a peripheral speed of 113 m/s with a turbo grinder as equipped with a blower and a cyclone for capturing pulverized products (TG-300 produced by Turbo Industry Co., Ltd., number of blades in a rotary disc: 320, and clearance: 0.2 mm). Subsequently, the resultant particulate pulverized product was dried with a fluidized-bed drying oven of 170° C., thus obtaining a particulate dried product. The particle diameter distribution of this particulate dried product as obtained was measured, so that it was as shown in Table 2.

COMPARATIVE EXAMPLE 3

A disintegrated (small divided) hydropolymer was obtained in the same way as of Example 6, and thereafter dried with a hot-air drying oven of 170° C., thus obtaining dried particles having a water content of 6 weight %.

When the dried particles as obtained were pulverized with a turbo grinder (TG-300 produced by Turbo Industry Co., Ltd., number of blades in a rotary disc: 320, and clearance: 0.2 mm) at a peripheral speed of 113 m/s, it seemed that fine particles occurred in a large amount. Therefore, the pulverization was carried out after having changed the clearance to 0.8 mm. The resultant particulate pulverized product was further dried with a fluidized-bed drying oven of 170° C., thus obtaining a particulate dried product. Its particle diameter distribution was as shown in Table 2.

From comparison with Example 6, it would be understood that: despite the enlargement of the clearance, there is seen the decrease of the yield of the particles having a particle diameter range of 150 to 850 μm (but excluding 850 μm), and further there is seen the increase of the occurrence of what is called fine powder such as the fine particles with particle diameters of smaller than 150 μm and the superfine particles with particle diameters of smaller than 106 μm.

COMPARATIVE EXAMPLES 4 AND 5

There occurred a large amount of fine powder in Comparative Example 3. Therefore the pulverization was carried out after having dropped the peripheral speed of the rotary blades (rotary disc having a plurality of blades) to 45 m/s and changed the clearance to 0.8 mm or 0.4 mm. As a result, the treated amount greatly reduced in comparison with those of Comparative Example 3 and Example 6. The resultant particulate pulverized product was further dried with a fluidized-bed drying oven of 170° C., thus obtaining a particulate dried product. Its particle diameter distribution was as shown in Table 2.

From comparison with Example 6, it would be understood that: in Comparative Example 4, even if the amount as treated is greatly sacrificed, there is seen the decrease of the yield of the particles having a particle diameter range of 150 to 850 μm (but excluding 850 μm), and further there is seen the increase of the occurrence of what is called fine powder such as the fine particles with particle diameters of smaller than 150 μm and the superfine particles with particle diameters of smaller than 106 μm, and further there is also seen the increase of the occurrence of the coarse particles with particle diameters of not smaller than 850 μm.

From comparison with Example 6, it would be understood that: in Comparative Example 5, even if the amount as treated is greatly sacrificed, there is seen the decrease of the yield of the particles having a particle diameter range of 150 to 850 μm (but excluding 850 μm), and further there is seen the increase of the occurrence of what is called fine powder such as the fine particles with particle diameters of smaller than 150 μm and the superfine particles with particle diameters of smaller than 106 μm.

COMPARATIVE EXAMPLE 6

The satisfactory particle diameter distribution was obtained in neither Comparative Example 4 nor 5. Therefore, the productivity was ignored to greatly slow the peripheral speed of the rotary blades (rotary disc having a plurality of blades) to 4 m/s, and the clearance was changed to 0.2 mm, thus carrying out the pulverization. Naturally, the amount as treated was only slight, needless to compare it with those of Example 6 and Comparative Examples 3 to 5. As shown in Table 2, as to the particle diameter distribution after the pulverization step, the yield of the particles having a particle diameter range of 150 to 850 μm (but excluding 850 μm) increased to about 84% barely by carrying out the pulverization in the above way, and further the yield of the fine particles with particle diameters of smaller than 150 μm could also be reduced to about 11%. However, from comparison with Example 6, it would be understood that: the yield of the particles having a particle diameter range of 150 to 850 μm (but excluding 850 μm) is still bad, and there is seen the increase of the amount of the fine particles with particle diameters of smaller than 150 μm.

EXAMPLE 7

A solution (A) and an aqueous NaOH solution (B) were each prepared, wherein the solution (A) was obtained by mixing 247 g of acrylic acid, 0.32 g of polyethylene glycol diacrylate (number-average molecular weight: 523), and 0.033 g of 45 weight % aqueous trisodium diethylenetriaminepentaacetate solution, and wherein the aqueous NaOH solution (B) was prepared by mixing 198 g of 48.5 weight % aqueous NaOH solution and 173 g of ion-exchanged water. The (A) and the (B) were mixed together under stirred conditions, thereby obtaining a monomer solution of which the liquid temperature was raised to about 98° C. due to the resultant heat of neutralization and heat of dissolution. Furthermore, 5.72 g of 3 weight % aqueous sodium persulfate solution was added to this monomer solution, and then they were stirred for a few seconds and immediately thereafter poured under an open system into an aluminum-made container having a bottom of 250×250 mm, wherein: the container was put on a hot plate of 90° C., and to the inner surface of this container there was attached a tape of Teflon (registered trade mark). The polymerization went on while the polymerizing mixture swelled and foamed in all directions along with emission of water vapor, and the mixture was left as it was for 3 minutes, thus obtaining a thin-sheet hydropolymer. Subsequently, this sheet hydropolymer was dried for 10 minutes with a hot-air drying oven of which the temperature had been adjusted to 180° C. Immediately after this drying, the resultant dried product was disintegrated (small divided) with a cutter mill (U-280, Horai Co., Ltd.) as equipped with a screen having a mesh opening size of 10 mm in diameter, thus obtaining a roughly disintegrated hydropolymer having particle diameters of about 1 to about 5 mm. This roughly disintegrated hydropolymer had a water content of 25 weight %.

Next, both the roughly disintegrated hydropolymer as obtained and propylene glycol of 1.5 weight % in amount relative to this hydropolymer were simultaneously charged to a turbo grinder as equipped with a blower and a cyclone for capturing pulverized products (TG-300 produced by Turbo Industry Co., Ltd., number of blades in a rotary disc: 320, and clearance: 0.2 mm), and then they were pulverized and simultaneously therewith mixed together, when the peripheral speed of the rotary blades (rotary disc having a plurality of blades) was 72 m/s. Subsequently, the resultant particulate pulverized product was dried with a fluidized-bed drying oven of 180° C. for 15 minutes, thus obtaining a surface-treated particulate dried product. The particle diameter distribution, GV, and AAP of this particulate dried product as obtained were measured, so that they were as shown in Table 3.

EXAMPLE 8

A roughly disintegrated hydropolymer having a water content of 19 weight % was obtained in the same way as of Example 7 except that the disintegration was carried out after the hot-air drying time of the sheet hydropolymer as obtained by the polymerization had been changed to 20 minutes.

Next, both the roughly disintegrated hydropolymer as obtained and propylene glycol of 1.5 weight % in amount relative to this hydropolymer were simultaneously charged to a turbo grinder as equipped with a blower and a cyclone for capturing pulverized products (TG-300 produced by Turbo Industry Co., Ltd., number of blades in a rotary disc: 320, and clearance: 0.2 mm), and then they were pulverized and simultaneously therewith mixed together, when the peripheral speed of the rotary blades (rotary disc having a plurality of blades) was 47 m/s. Subsequently, the resultant particulate pulverized product was dried with a fluidized-bed drying oven of 180° C. for 15 minutes, thus obtaining a surface-treated particulate dried product. The particle diameter distribution, GV, and AAP of this particulate dried product as obtained were measured, so that they were as shown in Table 3.

TABLE 1

| | Vertical pulverizer | | | | | | |
|---|---|---|---|---|---|---|---|
| | Example | | | | | Comparative Example | |
| | 1 | 2 | 3 | 4 | 5 | 1 | 2 |
| Water content (weight %) | 29.1 | 25.2 | 19.9 | 15.8 | 11.5 | 34.1 | 6.0 |
| Particle diameter distribution (weight %) | | | | | | | |
| on 1,000 μm | 3.3 | 3.1 | 1.8 | 1.0 | 0.8 | 5.2 | 0.5 |
| on 850 μm | 14.4 | 11.6 | 7.7 | 5.7 | 4.1 | 18.5 | 2.5 |
| on 600 μm | 40.7 | 35.1 | 30.9 | 27.1 | 22.3 | 40.5 | 16.5 |
| on 300 μm | 27.4 | 32.3 | 39.4 | 41.7 | 43.6 | 24.5 | 40.4 |
| on 150 μm | 7.4 | 10.4 | 12.3 | 14.2 | 16.2 | 6.8 | 18.3 |
| on 106 μm | 3.6 | 4.1 | 4.3 | 5.2 | 6.5 | 2.6 | 10.1 |
| pass 106 μm | 3.1 | 3.4 | 3.6 | 4.9 | 6.5 | 2.0 | 11.6 |
| 850/150 μm | 75.5 | 77.8 | 82.6 | 83.0 | 82.1 | 71.8 | 75.2 |
| 600/150 μm | 34.8 | 42.7 | 51.7 | 55.9 | 59.8 | 31.3 | 58.7 |
| pass 150 μm | 6.7 | 7.5 | 7.9 | 10.1 | 13.0 | 4.6 | 21.7 |

TABLE 2

| | Turbo grinder | | | | |
|---|---|---|---|---|---|
| | Example | Comparative Example | | | |
| | 6 | 3 | 4 | 5 | 6 |
| Water content (weight %) | 29 | 6 | 6 | 6 | 6 |
| Particle diameter distribution (weight %) | | | | | |
| on 850 μm | 5.7 | 0.6 | 10.9 | 0.3 | 5.8 |
| on 600 μm | 22.3 | 1.2 | 12.6 | 2.2 | 25.9 |
| on 300 μm | 47.5 | 8.0 | 31.2 | 21.7 | 39.0 |
| on 150 μm | 21.3 | 20.9 | 24.5 | 38.1 | 18.7 |
| on 106 μm | 2.9 | 15.1 | 8.3 | 13.7 | 9.2 |
| pass 106 μm | 0.2 | 54.2 | 12.5 | 24.0 | 1.4 |
| 850/150 μm | 91.1 | 30.1 | 68.3 | 62.0 | 83.6 |
| 600/150 μm | 68.8 | 28.9 | 55.7 | 59.8 | 57.7 |
| pass 150 μm | 3.1 | 69.3 | 20.8 | 37.7 | 10.6 |
| Clearance (mm) | 0.2 | 0.8 | 0.8 | 0.4 | 0.2 |
| Peripheral speed (m/s) | 113 | 113 | 45 | 45 | 4 |

TABLE 3

| | Turbo grinder | |
|---|---|---|
| | Example | |
| | 7 | 8 |
| Water content (weight %) | 25 | 19 |
| Particle diameter distribution (weight %) | | |
| on 850 μm | 7.4 | 3.8 |
| on 600 μm | 14.3 | 9.6 |
| on 300 μm | 45.8 | 50.3 |
| on 150 μm | 27.3 | 30.4 |
| on 106 μm | 3.3 | 3.7 |
| pass 106 μm | 2.0 | 2.2 |
| 850/150 μm | 87.4 | 90.3 |
| 600/150 μm | 71.3 | 80.7 |
| pass 150 μm | 5.3 | 5.9 |
| Clearance (mm) | 0.2 | 0.2 |
| Peripheral speed (m/s) | 72 | 47 |
| GV (g/g) | 34 | 40 |
| AAP (g/g) | 33 | 30 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for a particulate water-absorbent resin, which is carried out in such a manner that the particulate water-absorbent resin will contain particles with particle diameters of 150 to 850 μm (but excluding 850 μm) in an amount of not smaller than 75 weight % of the particulate water-absorbent resin after the pulverization step or after the pulverization step and the drying step;

wherein, in the pulverization step, a hydropolymer of a water-absorbent resin having a water content of 10 to 30 weight % is pulverized with a pulverizer.

2. A production process according to claim 1, wherein the hydropolymer of the water-absorbent resin having a water content of 10 to 20 weight % is pulverized with the pulverizer.

3. A production process according to claim 2, wherein the hydropolymer to be subjected to the pulverization step is a product obtained by the drying step of drying a hydropolymer of a water-absorbent resin having a water content of not less than 30 weight %.

4. A production process according to claim 1, which is carried out in such a manner that the particulate water-absorbent resin will contain particles with particle diameters of 150 to 850 μm (but excluding 850 μm) in an amount of not smaller than 80 weight % of the particulate water-absorbent resin after the pulverization step or after the pulverization step and the drying step.

5. A production process according to claim 1, which is carried out in such a manner that the particulate water-absorbent resin will contain fine particles with particle diameters of smaller than 150 μm in an amount of not larger than 15 weight % of the particulate water-absorbent resin after the pulverization step or after the pulverization step and the drying step.

6. A production process according to claim 1, which is carried out in such a manner that the particulate water-absorbent resin will contain superfine particles with particle diameters of smaller than 106 μm in an amount of not larger than 10 weight % of the particulate water-absorbent resin after the pulverization step or after the pulverization step and the drying step.

7. A production process according to claim 1, which is carried out in such a manner that the particulate water-absorbent resin will contain coarse particles with particle diameters of not smaller than 850 μm in an amount of not larger than 10 weight % of the particulate water-absorbent resin after the pulverization step or after the pulverization step and the drying step.

8. A production process according to claim 1, wherein the temperature of the hydropolymer is in the range of 30 to 100° C. during the pulverization step.

9. A production process according to claim 1, which further comprises the step of, at the same time as the pulverization step, mixing a surface-crosslinking agent or, at the same time as the pulverization step, mixing a surface-crosslinking agent to thereby carry out a crosslinking reaction.

10. A particulate water-absorbent resin, which displays an absorption capacity of 25 to 50 g/g without load and an absorption capacity of not less than 25 g/g under a load, and is obtained by a production process that is carried out in such a manner that the particulate water-absorbent resin will contain particles with particle diameters of 150 to 850 μm (but excluding 850 μm) in an amount of not smaller than 75 weight % of the particulate water-absorbent resin after the pulverization step or after the pulverization step and the drying step, wherein the production process for obtaining the particulate water-absorbent resin includes: the pulverization step of pulverizing a hydropolymer of a water-absorbent resin having a water content of 10 to 30 weight % with a pulverizer; and the step of, at the same time as the pulverization step, mixing a surface-crosslinking agent or, at the same time as the pulverization step, mixing a surface-crosslinking agent to thereby carry out a crosslinking reaction.

11. A particulate water-absorbent resin according to claim 10, which contains a finely particulate inorganic substance.

12. A sanitary material, which comprises the particulate water-absorbent resin as recited in claim 10.

* * * * *